(12) United States Patent
Brink

(10) Patent No.: US 6,179,114 B1
(45) Date of Patent: Jan. 30, 2001

(54) TORSION HOLDER CONVEYOR BELT SCRAPER

(75) Inventor: Jan Louis Brink, Centurion (ZA)

(73) Assignee: Slic Trading Company Limited, Douglas (GB)

(*) Notice: Under 35 U.S.C. 154(b), the term of this patent shall be extended for 0 days.

(21) Appl. No.: 09/330,070

(22) Filed: Jun. 11, 1999

(30) Foreign Application Priority Data

Jul. 23, 1998 (ZA) ................................. 98/6566

(51) Int. Cl.⁷ ............................................. B65G 45/00
(52) U.S. Cl. ................................... 198/499; 198/497
(58) Field of Search ........................ 198/499, 497, 198/732

(56) References Cited

U.S. PATENT DOCUMENTS

| | | |
|---|---|---|
| 4,633,999 | 1/1987 | Perneczky . |
| 4,768,644 | 9/1988 | Cromm . |
| 4,850,474 * | 7/1989 | Schwarze ............................... 198/499 |
| 4,962,845 * | 10/1990 | Gibbs ................................... 198/499 |
| 5,082,106 * | 1/1992 | Schwarze ............................... 198/499 |
| 5,088,965 | 2/1992 | Swinderman et al. . |
| 5,201,402 | 4/1993 | Mott . |
| 5,301,797 * | 4/1994 | Hollyfield, Jr. et al. ............. 198/499 |
| 5,339,947 | 8/1994 | Campanile . |
| 5,518,107 | 5/1996 | Schwarz . |
| 5,826,700 * | 10/1998 | Brink .................................. 198/497 |
| 5,950,803 * | 9/1999 | Schwarze .............................. 198/499 |
| 5,992,614 * | 11/1999 | Mott .................................... 198/499 |

FOREIGN PATENT DOCUMENTS

| | | | |
|---|---|---|---|
| 2709714 * | 9/1978 | (DE) | ................................... 198/499 |
| 0251051 * | 1/1988 | (EP) | ................................... 198/499 |
| 0574600 A1 | 6/1992 | (EP) | . |
| 2227991 * | 8/1990 | (GB) | ................................... 198/499 |
| 2315724 | 7/1997 | (GB) | . |
| 2290276 | 3/1998 | (GB) | . |
| 63-31926 | 2/1988 | (JP) | . |
| 740637 | 5/1980 | (SU) | . |

* cited by examiner

*Primary Examiner*—Dean J. Kramer
*Assistant Examiner*—Paul T. Chin
(74) *Attorney, Agent, or Firm*—Jones, Tullar & Cooper, PC

(57) ABSTRACT

The invention provides a torsion holder for a conveyor belt scraper which includes a first tubular member with formations which are engageable with fixed structure, a second member which is located at least partly inside the first member, torsion mechanism between the first and second members for resiliently restraining relative rotational movement of the second member inside the first member, a scraper blade carrier, and attachment mechanism engaged with the second member and the scraper blade carrier.

14 Claims, 2 Drawing Sheets

TORSION HOLDER CONVEYOR BELT SCRAPER

BACKGROUND TO THE INVENTION

This invention relates generally to a conveyor belt scraper and more particularly to a torsion holder for a belt scraper.

SUMMARY OF THE INVENTION

The invention provides a torsion holder for a conveyor belt scraper which includes a first tubular member with formations which are engageable with fixed structure, a second member which is located at least partly inside the first member, torsion means between the first and second members for resiliently restraining relative rotational movement of the second member inside the first member, a scraper blade carrier, and attachment means engaged with the second member and the scraper blade carrier.

The attachment means and the first member may include one or more bearing surfaces which facilitate the aforementioned rotational movement.

Sealing means may be provided between the attachment means and the first member.

The first member may be formed from at least two components which may be interengaged with one another in any appropriate way.

The first member may have any appropriate cross-section but preferably is square in cross-section.

Similarly the second member may have any appropriate cross-section but preferably is square in cross-section.

The first member may be displaced relatively to the second member by approximately 45° viewed in the axial directions of the two members.

The attachment means may comprise any suitable device or devices and preferably includes two bosses with formations which are respectively engageable with the scraper blade carrier and the second member.

The bosses may also include circular formations which are rotatably engageable with complementary circular formations on the first member.

The formations on the first member which are engageable with fixed structure may be shaped to engage with a sliding fit with a channel which includes a complementary cross-section to the shape of the formations.

A scraper blade may be attached to the blade carrier in any appropriate way and for example the blade carrier may include a groove or slot which receives a lower edge of an appropriate scraper blade.

The blade carrier may include protective skirts which depend downwardly from the groove and which at least partially obscure the first and second members thereby to protect these members against the effects of dirt or other foreign material.

The torsion means may be of any suitable shape, size or material and preferably includes one or more rubber elements located in one or more respective volumes between opposing surfaces of the first and second members.

BRIEF DESCRIPTION OF THE DRAWINGS

The invention is further described by way of example with reference to the accompanying drawings in which.

DESCRIPTION OF PREFERRED EMBODIMENT

Figure 1:
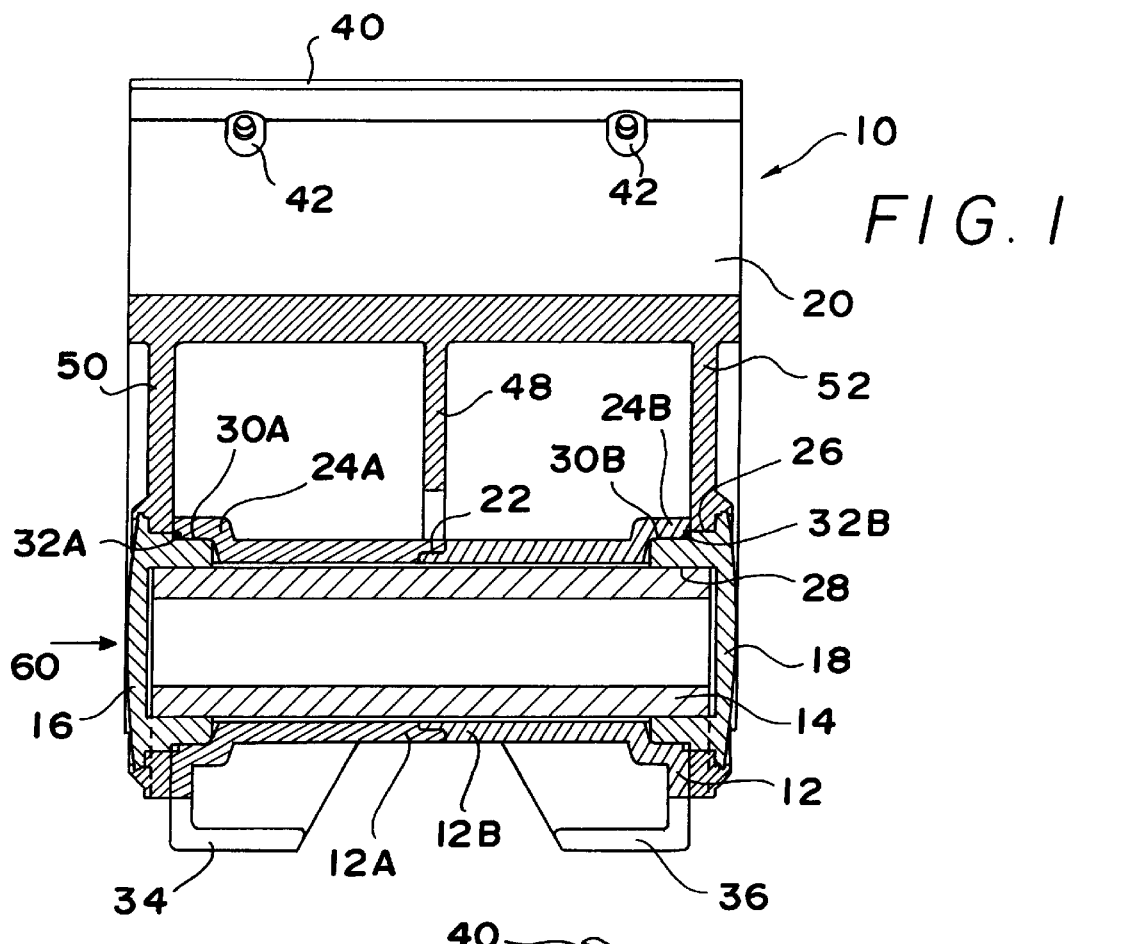
FIG. 1 is a cross-sectional side view of a torsion holder according to the invention.

The accompanying drawings illustrate a torsion holder 10 according to the invention which includes a first or outer tubular member 12, a second or inner member 14, two bosses 16 and 18 respectively, and a scraper blade carrier 20.

The outer tubular member 12 is formed from two components designated 12A and 12B respectively which have mating complementary formations 22 which enable the components to be interengaged with each other.

Figure 2:
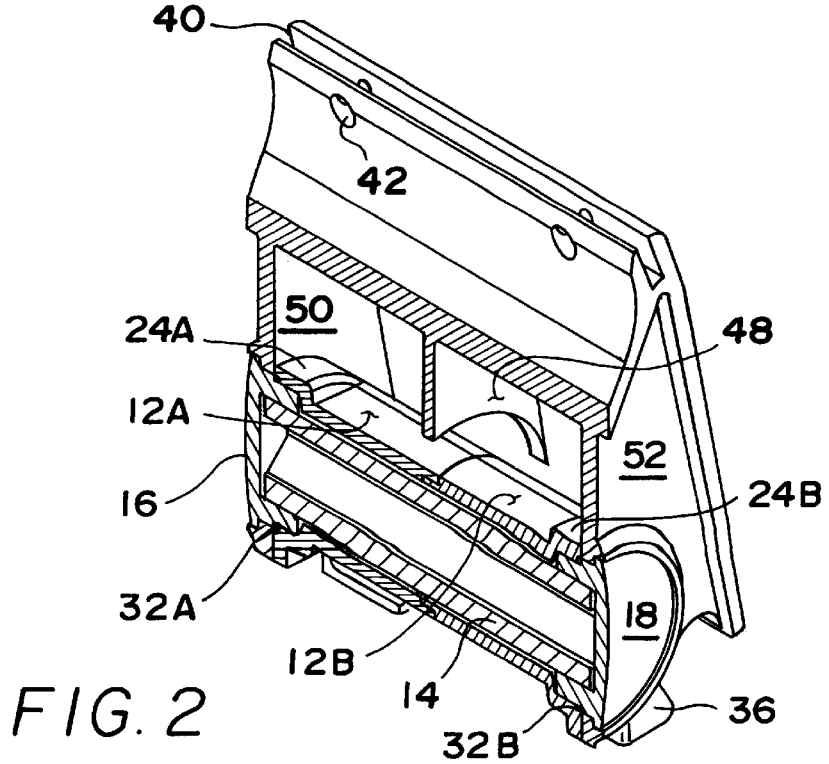
FIG. 2 is a sectioned perspective view of the torsion holder shown in FIG. 1.
Figure 3:
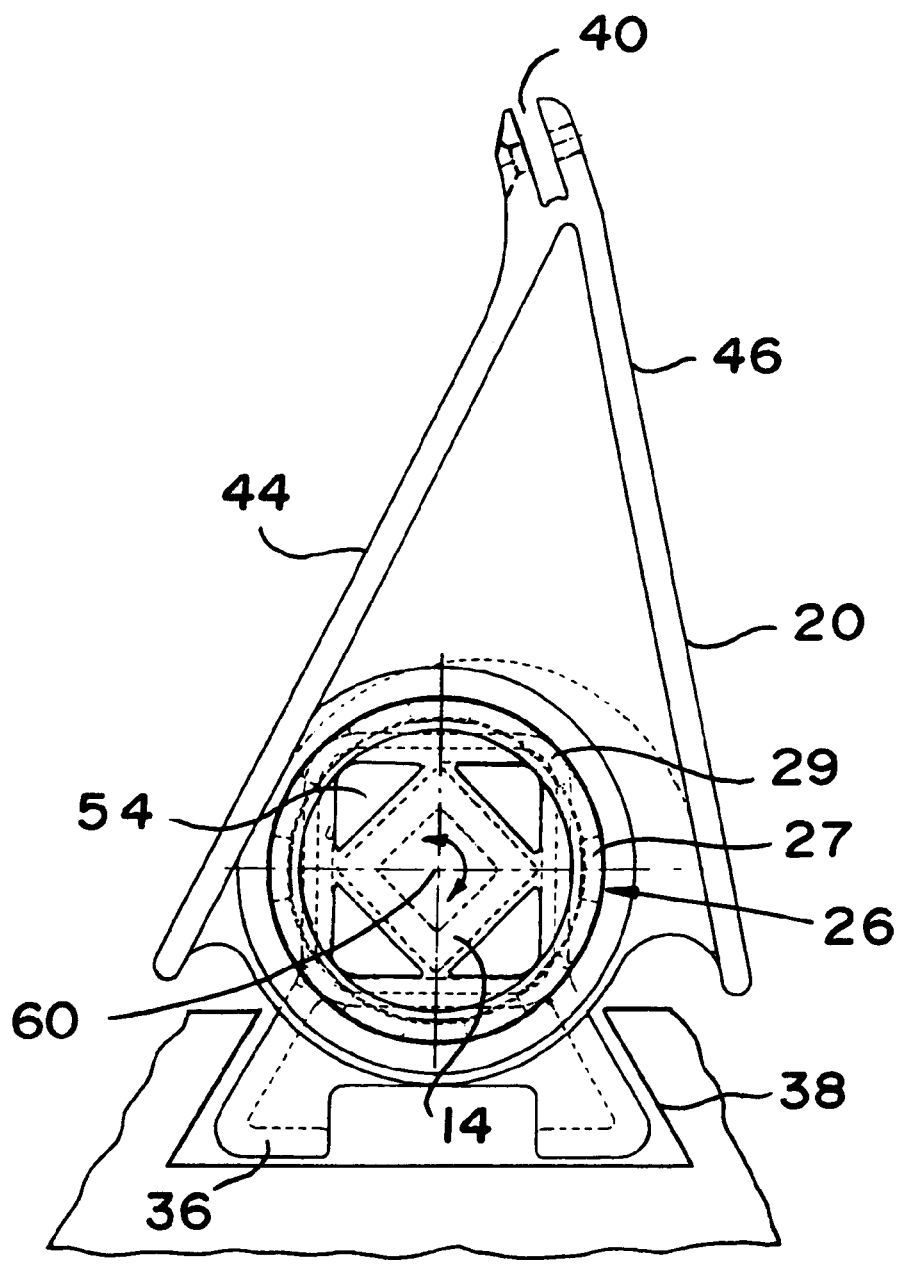
FIG. 3 is an end view of the torsion holder of the invention.

As is evident from FIGS. 2 and 3 each component 12A, 12B, has a square cross-section and, at each respective end remote from the formations 22, each component has an enlarged circular socket 24A, 24B.

The inner member 14, as is shown in FIG. 3, also has a square cross-section although its orientation, relatively to the outer member, is displaced by 45° in the axial sense.

The bosses 16 and 18 are similar in construction. Each boss, at a region marked 26, has formations which engage securely with complementary formations on a surrounding section of the blade carrier 20.

Also, at a region marked 28, each boss has a square cross-section which engages securely with a respective end of the inner member 14 which, in this example, has a tubular construction. On the other hand each boss has a section 30A, 30B respectively which extends into one of the sockets 24A, 24B and this section is circular so that it acts as a bearing surface inside the recess. Thus the blade carrier 20 is rotatable, at least to a limited extent, in unison with the bosses which are fixed to the blade carrier and the member 14, relatively to the member 12.

O-ring seals 32A and 32B respectively are positioned between the bosses 16 and 18 and the sockets 24A and 24B.

The components 12A and 12B of the outer member have outwardly extending legs 34, 36. These legs are engageable with a sliding fit in a channel 38 of complementary shape which forms part of a suitable support structure, as is indicated schematically in FIG. 3.

The blade carrier 20 includes an upper groove or slot 40 which, in use, receives the base of a conveyor belt scraper, not shown. Fixing holes 42 accommodate bolts which secure the scraper blade to the slot.

Two protective skirts 44 and 46 extend downwardly from the slot. The skirts are internally braced by means of a rib 48 and the volume between the ribs is sealed by means of end walls 50 and 52 which are suitably shaped to receive the bosses 16 and 18 respectively, in the manner which has been described.

Referring to FIG. 3 rubber torsion elements 54, which are generally triangular in cross-section, are positioned inside respective volumes or open spaced formations between the apices of the outer member 12 and opposing flat outer surfaces of the inner member 14. The torsion elements, when compressed, permit limited rotational movement of the member 14 relatively to the member 12, in an axial sense, and exert a restoring force which tends to restore the member 14 to the orientation, relative to the member 12 shown in FIG. 3.

In use the torsion holder is mounted, in the manner illustrated in FIG. 3, to a suitable support structure having the channel 38 and a blade, not shown, is engaged with the slot 40. The blade is brought into engagement with a surface of a conveyor belt, not shown, which is to be scraped. This aspect is known and for this reason is not elaborated on herein.

During operation of the conveyor belt scraper, forces are exerted on the scraper blade by the conveyor belt which cause the blade carrier 20 to rotate about the central axis 60 of the assembly, referred to in FIG. 3. The rotational movement is damped by the torsion elements 54 which, as has been noted, exert a restoring force which returns the blade carrier to the central position shown in FIG. 3.

The sockets 24A and 24B and the circular sections 30A and 30B respectively of the bushes, act as bearing surfaces and permit guided rotational movement of the inner member relatively to the outer member. The O-ring seals 32A and 32B restrict the ingress of foreign material into the spaces between the two members. The protective skirts 44 and 46 also protect the interior of the assembly against the ingress of foreign material. Further, as is evident from an inspection of FIGS. 1 and 2, the bosses 16 and 18 are intimately engaged with the side walls 50 and 52 and the ingress of foreign material through the spaces between the interfacing surfaces of these components is also restricted.

The various components of the torsion holder are made from any suitable material, and preferably are injection moulded from a plastics material with desirable properties.

What is claimed is:

1. A torsion holder for a conveyor belt scraper comprising:
   a first hollow member having inner surfaces and which is engageable with a fixed structure;
   a second member having outer surfaces and which is located at least partly inside said first member;
   open spaced volumes between said inner surfaces of said first hollow member and said outer surfaces of said second member;
   resilient torsion elements in said open spaced volumes between said first and second members, said resilient torsion elements resiliently permitting limited relative rotational movement of said second member inside said first member;
   a scraper blade carrier; and
   attachment means securing said second member and said scraper blade carrier together.

2. A holder according to claim 1 wherein said attachment means and said first hollow member include at least one bearing surface to facilitate said relative rotational movement.

3. A holder according to claim 1 which includes sealing means between said attachment means and said first hollow member.

4. A holder according to claim 1 wherein said first hollow member is formed from at least two interengaged components.

5. A holder according to claim 1 wherein said first hollow member is square in cross-section.

6. A holder according to claim 5 wherein said second member is square in cross-section.

7. A holder according to claim 6 wherein said first hollow member and said second member are relatively displaced by approximately 45°, viewed in the axial direction of said first and second members.

8. A holder according to claim 1 wherein said attachment means includes two bosses with formations which are respectively engageable with said scraper blade carrier and said second member.

9. A holder according to claim 8 wherein said bosses include circular formations which are rotatable engageable with complementary circular formations of said first hollow member.

10. A holder according to claim 8 wherein said bosses and said scraper blade carrier are rotatable in unison, to a limited extent, relatively to said first hollow member.

11. A holder according to claim 1 further including formations on said first hollow member and a channel in said fixed structure and wherein said formations on said hollow first member are slidably engagable with said channel of said fixed structure, said channel including a cross-sectional shape which is complementary to said shape of said formations.

12. A holder according to claim 1 wherein said scraper blade carrier includes a groove which receives a lower edge of a scraper blade.

13. A holder according to claim 1 wherein said scraper blade carrier includes protective skirts which depend downwardly and which at least partially obscure said first and second members.

14. A torsion holder for a conveyer belt scraper comprising:
   a first tubular member which is engageable with a fixed structure;
   a second member which is located at least partly inside said first member;
   torsion means between said first and second members for resiliently restraining relative rotational movement of said second member inside said first member;
   a scraper blade carrier; and
   first and second attachment bosses, each of said first and second attachment bosses being non-rotatably engaged with said scraper blade carrier, and being non-rotatably engaged with a respective end of said second member.

* * * * *